United States Patent [19]
Morgenstern et al.

[11] 3,838,277
[45] Sept. 24, 1974

[54] OPTICAL SENSOR WITH LINEAR PARABOLIC MIRROR

[75] Inventors: Bodo Morgenstern; Bert Soderholm, both of Santhorst, Netherlands

[73] Assignee: Organisation Europeenne de Recherches Spatiales, Neuilly-sur-Seine, France

[22] Filed: June 14, 1973

[21] Appl. No.: 370,030

[30] Foreign Application Priority Data
June 28, 1972 Belgium ............................... 119239

[52] U.S. Cl. .............. 250/216, 250/227, 250/203 R
[51] Int. Cl. ............................................. H01j 3/14
[58] Field of Search ........ 250/216, 227, 203 R, 237; 350/206; 244/1 SA

[56] References Cited
UNITED STATES PATENTS

| | | | |
|---|---|---|---|
| 2,944,156 | 7/1960 | Davy et al. ....................... | 250/216 X |
| 3,274,392 | 9/1966 | Harling ............................... | 250/227 |
| 3,491,245 | 1/1970 | Hardesty ............................ | 250/227 |
| 3,567,948 | 3/1971 | Oke ..................................... | 250/216 |

*Primary Examiner*—Walter Stolwein
*Attorney, Agent, or Firm*—Hill, Gross, Simpson, Van Santen, Steadman, Chiara & Simpson

[57] ABSTRACT

A fan beam optical sensor comprising a linear parabolic mirror, an elongated block element of transparent material having a first entrance face for the incident light and a second face opposite to the first face and onto which is fixed said linear parabolic mirror with the reflecting surface thereof in contact with said second face. The block element further has a third longitudinal face opposite to the reflecting surface of said linear parabolic mirror, a layer of opaque material deposited onto said third longitudinal face with a longitudinal slit formed therein, said slit being located on the focal line of said linear parabolic mirror. One or more detector means are disposed along said longitudinal slit to sense the reflected light energy from the linear parabolic mirror through said slit and to convert it into electrical signals. The entrance face can be covered with a shadowing mask of opaque material, said mask having a longitudinal aperture formed therein, said aperture having an increasing width from the middle of its length to both ends thereof.

3 Claims, 5 Drawing Figures

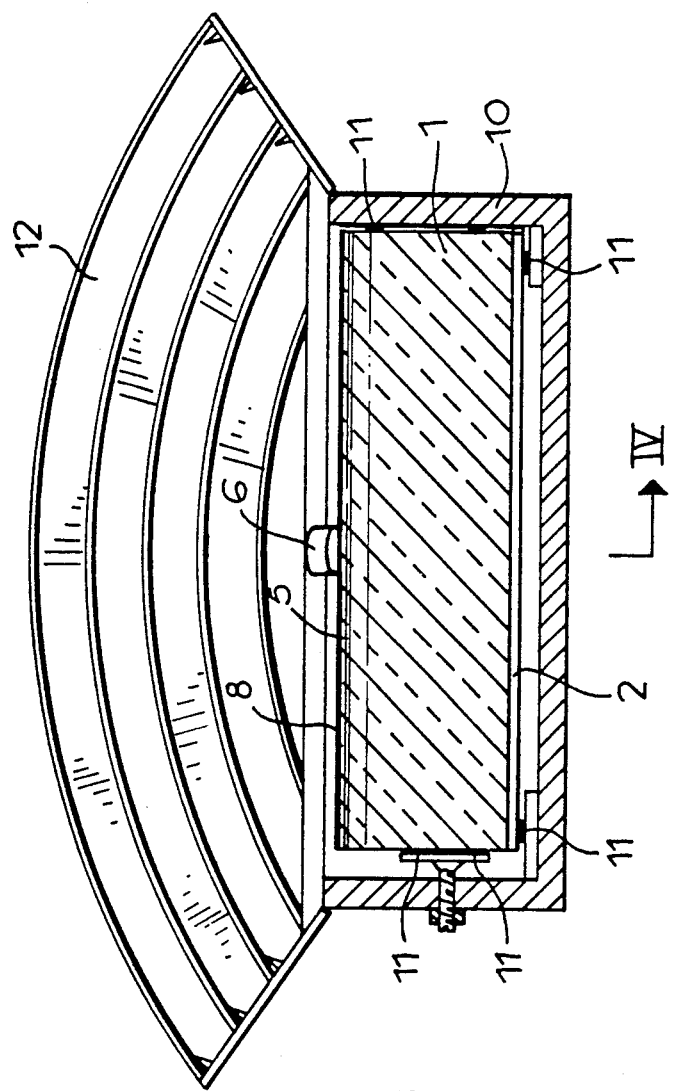
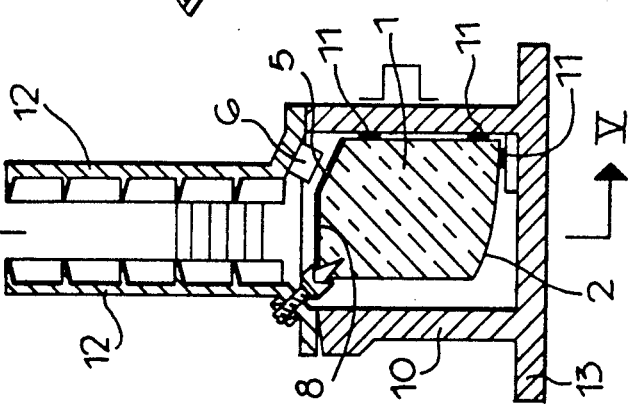

OPTICAL SENSOR WITH LINEAR PARABOLIC MIRROR

The present invention relates to a fan beam optical sensor with linear parabolic mirror.

An optical sensor is used on spinning spacecrafts to determine the attitude thereof with respect to the inertial space. Such a sensor generally consists of an optical system which collects the light from a target (sun, moon, earth or any star) and transmits it through a circular aperture (in a pencil beam sensor) or a slit (in a fan beam sensor) located in the focal plane and behind which is a detector to convert the incident light into an electrical signal.

A fan beam sensor can use optical system of various types. One among the most attractive types comprises a linear parabolic mirror on the focal line of which is provided a rectilinear slit.

This system is quite satisfactory in the applications where a crosswise extension of view not exceeding 0.05° only is required.

The object of the invention is to provide a fan beam optical sensor having a lengthwise extension of view of about 120° and a crosswise extension of view equal to or greater than 0.05° with a sensing accuracy greater than that of the conventional fan beam sensors.

According to the invention there is provided an optical sensor comprising a linear parabolic mirror fixed onto the surface of an elongated block element of transparent material with its reflecting surface facing the inside of said block element. Opposite to the reflecting surface of the mirror said block element has a longitudinal face which is covered with a layer of opaque material wherein there is formed a longitudinal slit located on the focal line of the linear parabolic mirror. The block elements forms a rigid support means for the sensor components, i.e., a support means which withstands vibration.

The entrance face of the transparent block element is advantageously covered with a shadowing mask wherein there is formed a longitudinal aperture the width of which increases from the middle of its length to both ends thereof.

A plurality of photodetectors can be mounted along the longitudinal slit to sense the reflected light from the mirror through the slit and to convert it into electrical signals. Each photodetector can be adapted to sense light of a different wavelength thereby to perform a different task.

In the drawings:

FIGS. 4 and 5 are cross-sectional and lengthwise sectional views, respectively, of a particular embodiment of an optical sensor according to the invention.

Figure 1:
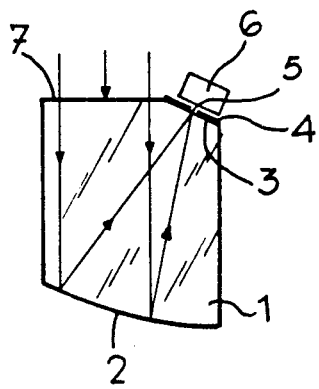
FIGS. 1 and 2 show in cross-sectional and lengthwise sectional views, respectively, the arrangement of the invention.
Figure 2:
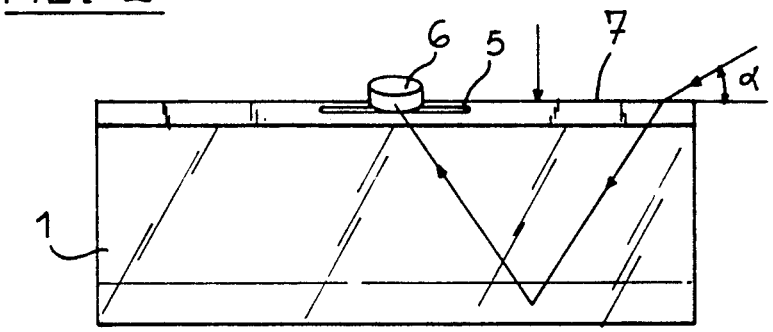

Referring to FIGS. 1 and 2 there is shown schematically the arrangement according to the invention. An elongated block 1 of transparent material has, opposite to its entrance face 7, a second face onto which is fixed a linear parabolic mirror 2 with the reflecting surface thereof in contact with said second face in order to be able to reflect the incident light through block 1. Opposite to said second face the block 1 has a longitudinal slant face 3 which is covered with an opaque material 4. In opaque layer 4 there is formed a longitudinal slit 5 located on the focal line of mirror 2. One or more detectors such as 6 can be mounted opposite to slit 5.

The light from a target such as the sun, the moon or the like, impinges the entrance face 7 of block 1 and enters it. The light is then reflected by mirror 2 and focused in slit 5 for being sensed by detector 6.

To reduce the light scattering, the entire surface of block 1 is covered with a light absorbing material, except on the entrance face and on the areas where the slit and the mirror are located.

Figure 3:
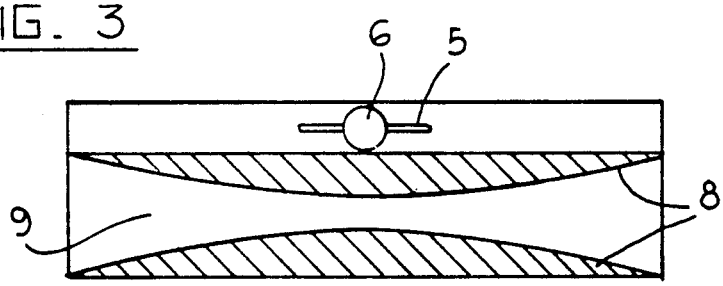
FIG. 3 is a top view of an advantageous embodiment of the device of FIGS. 1 and 2.

In an advantageous embodiment shown in FIG. 3, the entrance face 7 has a shadowing mask 8 of opaque material deposited thereon with a longitudinal aperture 9 formed therein. The width of aperture 9 increases from the middle of its length up to both ends thereof. This mask compensates for the different amount of light which would otherwise be collected for different longitudinal aspect angles.

The arrangement of the invention advantageously permits a plurality of detectors to be mounted along one and the same slit, thereby enabling the use of a single optical block element to sense the position of several different targets. In this manner it is possible to provide a sun sensor and an earth albedo sensor (i.e., the sun light reflected by the earth) for instance, whereby installation on board of a satellite is considerably simplified.

FIGS. 4 and 5 schematically depict a particular illustrative embodiment of an optical sensor according to the invention. FIG. 4 is a cross-sectional view and FIG. 5 is a longitudinal section. On these drawings, 1 is the block element of transparent material, 2 is the linear parabolic mirror, 5 is the longitudinal slit, 6 is a detector and 8 is the entrance shadowing mask. The assembly is mounted in a housing 10. The block 1 contacts the housing 10 only through thin films 11 of insulating material such as Teflon. The housing is provided with longitudinal protecting plates 12 to prevent sun interference with the sensor when the latter is directed towards a least bright target, e.g., the earth. The sensor is fixed to the satellite by means of flange 13.

What is claimed is:

1. A fan beam optical sensor comprising a linear parabolic mirror; an elongated block element of transparent material having a first entrance face for the incident light, a second face opposite to the first face and onto which is fixed said linear parabolic mirror with the reflecting surface thereof in contact with said second face, and a third longitudinal face opposite to the reflecting surface of said linear parabolic mirror; a layer of opaque material deposited onto said third longitudinal face with a longitudinal slit formed therein, said slit being located on the focal line of said linear parabolic mirror; and at least one detector means disposed along said longitudinal slit to sense the reflected light energy from the linear parabolic mirror through said slit and to convert it into electrical signals.

2. The optical sensor of claim 1, wherein each detector means is adapted to sense light of a different wavelength.

3. The optical sensor of claim 1, wherein said first entrance face is covered with a shadowing mask of opaque material, said mask having a longitudinal aperture formed therein, said aperture having an increasing width from the middle of its length to both ends thereof.

* * * * *